US011092798B2

(12) United States Patent
Takumi

(10) Patent No.: US 11,092,798 B2
(45) Date of Patent: Aug. 17, 2021

(54) OBSERVATION APPARATUS AND IMAGE PICKUP APPARATUS

(71) Applicant: CANON KABUSHIKI KAISHA, Tokyo (JP)

(72) Inventor: Ai Takumi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 100 days.

(21) Appl. No.: 16/288,419

(22) Filed: Feb. 28, 2019

(65) Prior Publication Data

US 2019/0271900 A1 Sep. 5, 2019

(30) Foreign Application Priority Data

Mar. 2, 2018 (JP) .............................. JP2018-037250

(51) Int. Cl.
*G02B 25/00* (2006.01)
*G03B 13/06* (2021.01)
*G02B 23/14* (2006.01)
*H04N 5/225* (2006.01)

(52) U.S. Cl.
CPC ........... *G02B 25/001* (2013.01); *G02B 23/14* (2013.01); *G03B 13/06* (2013.01); *H04N 5/22525* (2018.08)

(58) Field of Classification Search
CPC .... G03B 13/06; H04N 5/22525; G02B 23/14; G02B 25/00; G02B 25/001
USPC ................................................. 359/646, 647
See application file for complete search history.

(56) References Cited

U.S. PATENT DOCUMENTS

| 5,703,721 A | 12/1997 | Bietry et al. |
| 6,809,875 B2 * | 10/2004 | Minakata ............. G02B 25/001 359/643 |
| 2019/0171000 A1 | 6/2019 | Takumi |

FOREIGN PATENT DOCUMENTS

| JP | H05119274 A | 5/1993 |
| JP | H0634893 A | 2/1994 |
| JP | H0829705 A | 2/1996 |
| JP | 2009210656 A | 9/2009 |

OTHER PUBLICATIONS

Notice of Reasons for Refusal issued by the Japan Patent Office dated Mar. 10, 2020 in corresponding JP Patent Application No. 2018-037250, with English translation.

* cited by examiner

*Primary Examiner* — Marin Pichler
*Assistant Examiner* — Mitchell T Oestreich
(74) *Attorney, Agent, or Firm* — Carter, DeLuca & Farrell LLP

(57) ABSTRACT

Provided is an observation apparatus including an image display element and an eyepiece optical system to be used to observe an image displayed on the image display element, in which the eyepiece optical system includes a plurality of lenses consisting of, in order from an image display plane side to an observation side, a first lens having a negative refractive power and a second lens having a positive refractive power, and in which a paraxial curvature radius of a lens surface on the image display plane side of the first lens, a paraxial curvature radius of a lens surface on the observation side of the first lens, a paraxial curvature radius of a lens surface on the image display plane side of the second lens, and a paraxial curvature radius of a lens surface on the observation side of the second lens are set appropriately.

8 Claims, 11 Drawing Sheets

OBSERVATION APPARATUS AND IMAGE PICKUP APPARATUS

BACKGROUND OF THE INVENTION

Field of the Invention

The present invention relates to observation apparatus and image pickup apparatus.

Description of the Related Art

In the related art, in an electronic viewfinder (observation apparatus), an eyepiece optical system is used to enlarge and observe an image displayed on an image display plane of a liquid crystal or other image display element.

In order to increase visibility of the image display plane, it is required of the eyepiece optical system to have a sufficiently wide field of view (high observation magnification) and high optical performance with satisfactorily corrected aberrations, among others. Further, with demand for downsizing of the observation apparatus, there is a demand for an eyepiece optical system with a reduced number of lenses, which is suitable for an image display element, which is used in the observation apparatus and has an image display plane having small dimensions (for example, 20 mm or less in diagonal length).

In the related art, there have been proposed various eyepiece optical systems with reduced numbers of lenses. For example, in Japanese Patent Application Laid-Open No. H08-029705, there is disclosed an eyepiece optical system consisting of, in order from an image display plane side to an observation side, a first lens having a negative refractive power, and a second lens having a positive refractive power, which has a strong curvature on an object side. Moreover, in Japanese Patent Application Laid-Open No. H05-119274, there is disclosed an eyepiece lens consisting of a lens having a negative refractive power and a lens having a positive refractive power to obtain high optical performance using aspherical surfaces.

SUMMARY OF THE INVENTION

According to an aspect of the present invention, an observation apparatus includes: an image display element configured to display an image on an image display plane; and an eyepiece optical system to be used to observe the image displayed on the image display plane, wherein the eyepiece optical system includes a plurality of lenses consisting of, in order from the image display plane side to an observation side, a first lens having a negative refractive power and a second lens having a positive refractive power, and wherein the following conditional expressions:

$-15.0 \leq (r11+r12)/(r11-12) \leq -0.2;$ $-0.25 \leq (r21+r22)/(r21-r22) \leq 1.50;$ and $0.19 < PN/f < 0.40,$ are satisfied where r11 represents a paraxial curvature radius of a lens surface on the image display plane side of the first lens, r12 represents a paraxial curvature radius of a lens surface on the observation side of the first lens, r21 represents a paraxial curvature radius of a lens surface on the image display plane side of the second lens, r22 represents a paraxial curvature radius of a lens surface on the observation side of the second lens, f represents a focal length of the eyepiece optical system, and PN represents half a diagonal length of the image display plane of the image display element.

Further features of the present invention will become apparent from the following description of exemplary embodiments with reference to the attached drawings.

DESCRIPTION OF THE EMBODIMENTS

Now, an eyepiece optical system according to each of Examples of the present invention and an observation apparatus including the same are described. The eyepiece optical system in each of Examples is an eyepiece optical system including a plurality of lenses, which is used to observe an image (image display plane) displayed on an image display element. The eyepiece optical system consists of, in order from the image display plane side to an observation side, a first lens having a negative refractive power and a second lens having a positive refractive power.

Figure 1:
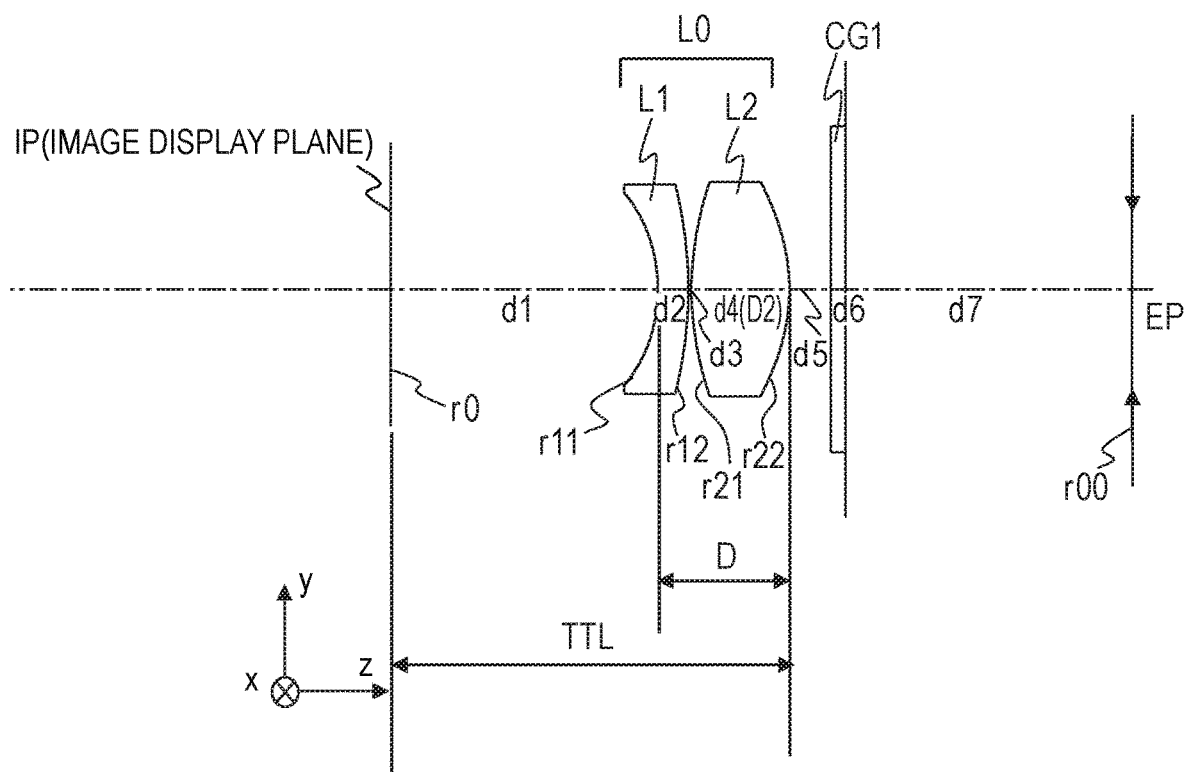
FIG. 1 is a cross-sectional view for illustrating a lens configuration of an eyepiece optical system according to Example 1 of the present invention.
Figure 2:
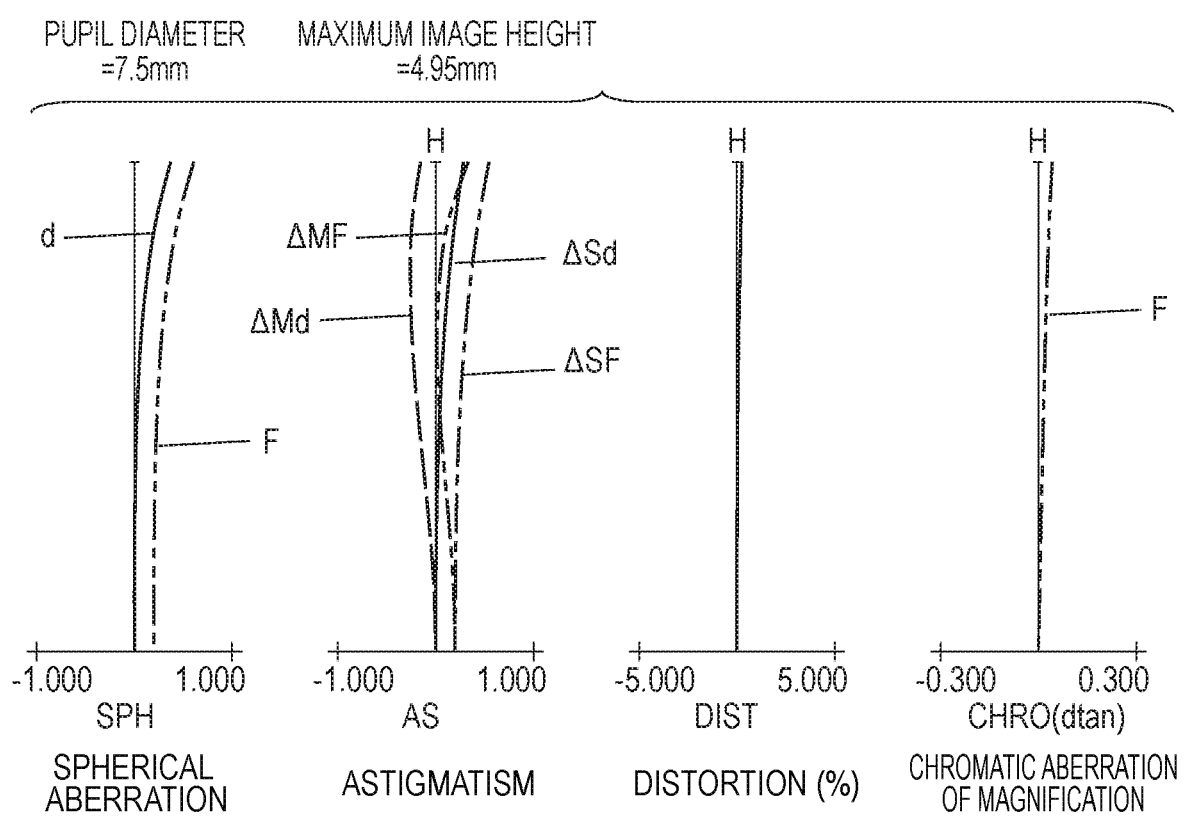
FIG. 2 is aberration diagrams of the eyepiece optical system according to Example 1.

FIG. 1 is a lens cross-sectional view of an eyepiece optical system according to Example 1 of the present invention. FIG. 2 is aberration diagrams of the eyepiece optical system according to Example 1 of the present invention at a diopter of −1.0 (standard diopter).

Figure 3:
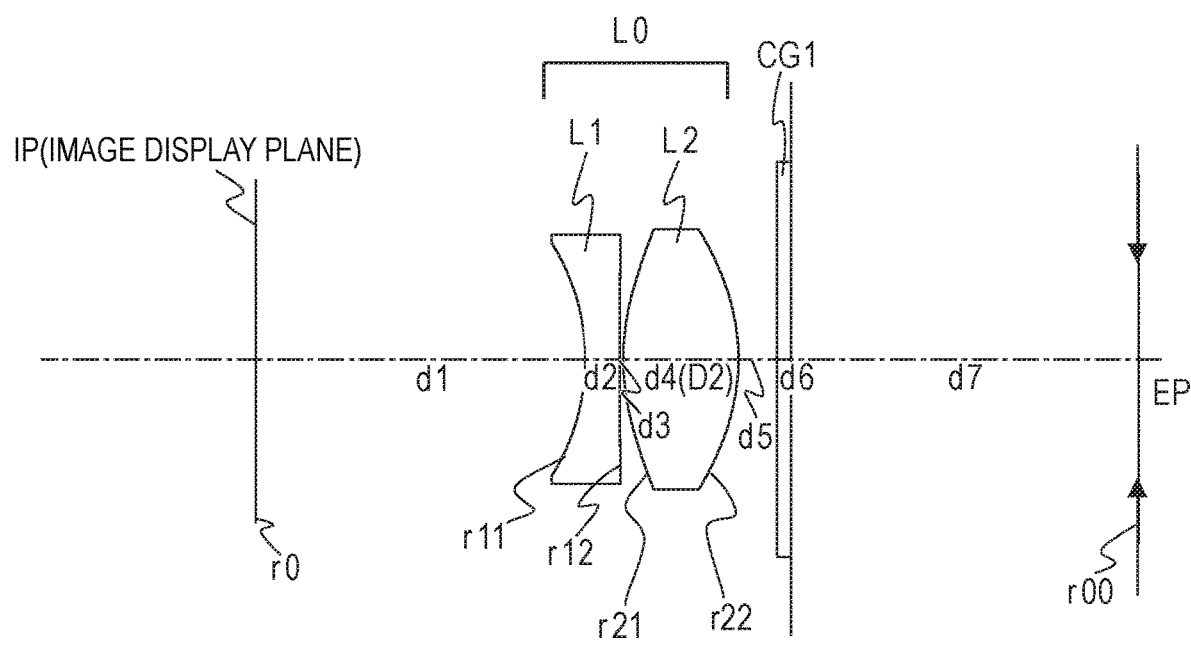
FIG. 3 is a cross-sectional view for illustrating a lens configuration of an eyepiece optical system according to Example 2 of the present invention.
Figure 4:
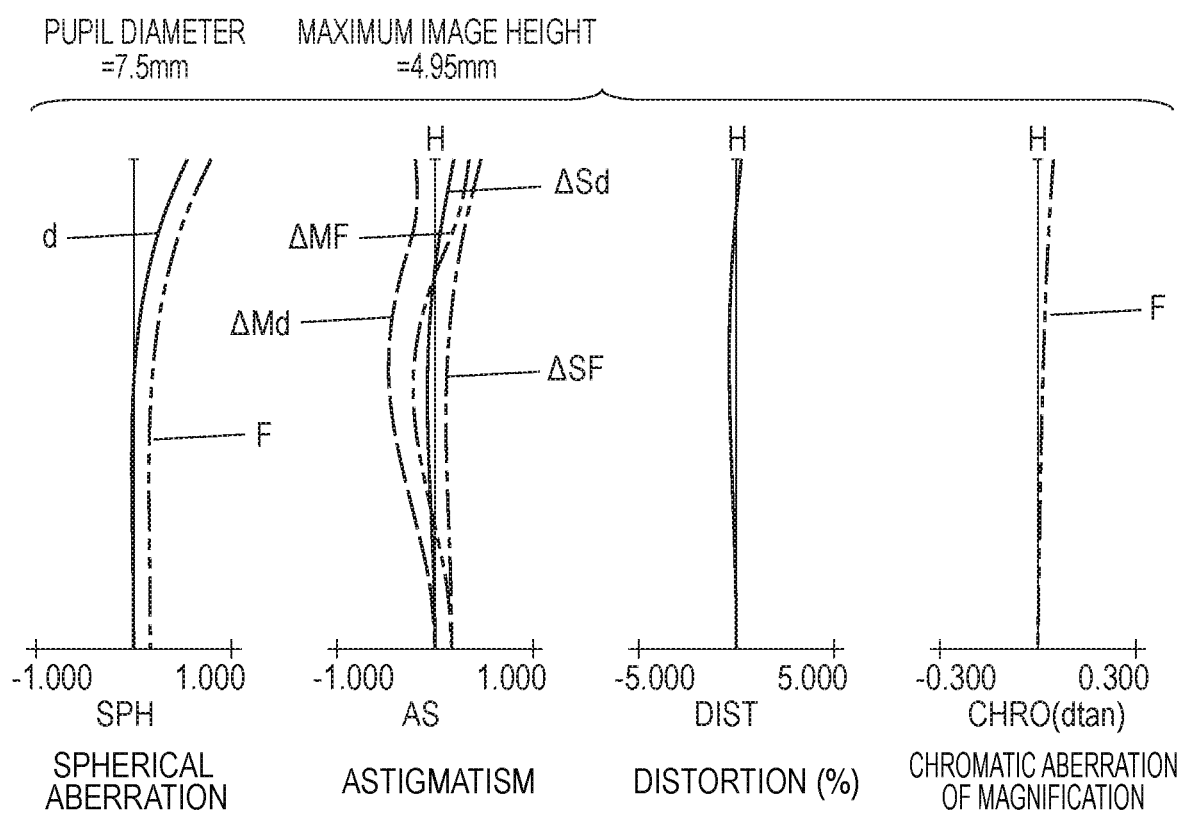
FIG. 4 is aberration diagrams of the eyepiece optical system according to Example 2.

FIG. 3 is a lens cross-sectional view of an eyepiece optical system according to Example 2 of the present invention. FIG. 4 is aberration diagrams of the eyepiece optical system according to Example 2 of the present invention at a diopter of −1.0.

Figure 5:
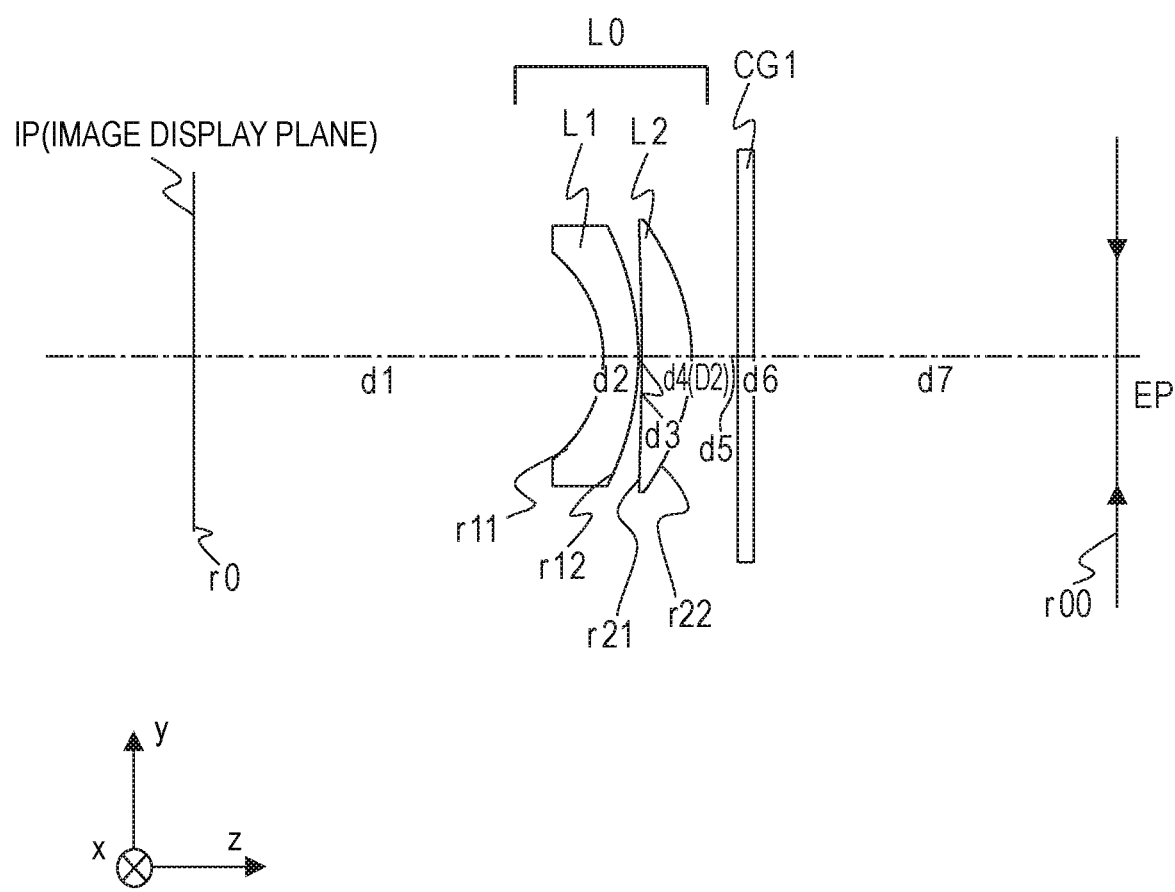
FIG. 5 is a cross-sectional view for illustrating a lens configuration of an eyepiece optical system according to Example 3 of the present invention.
Figure 6:
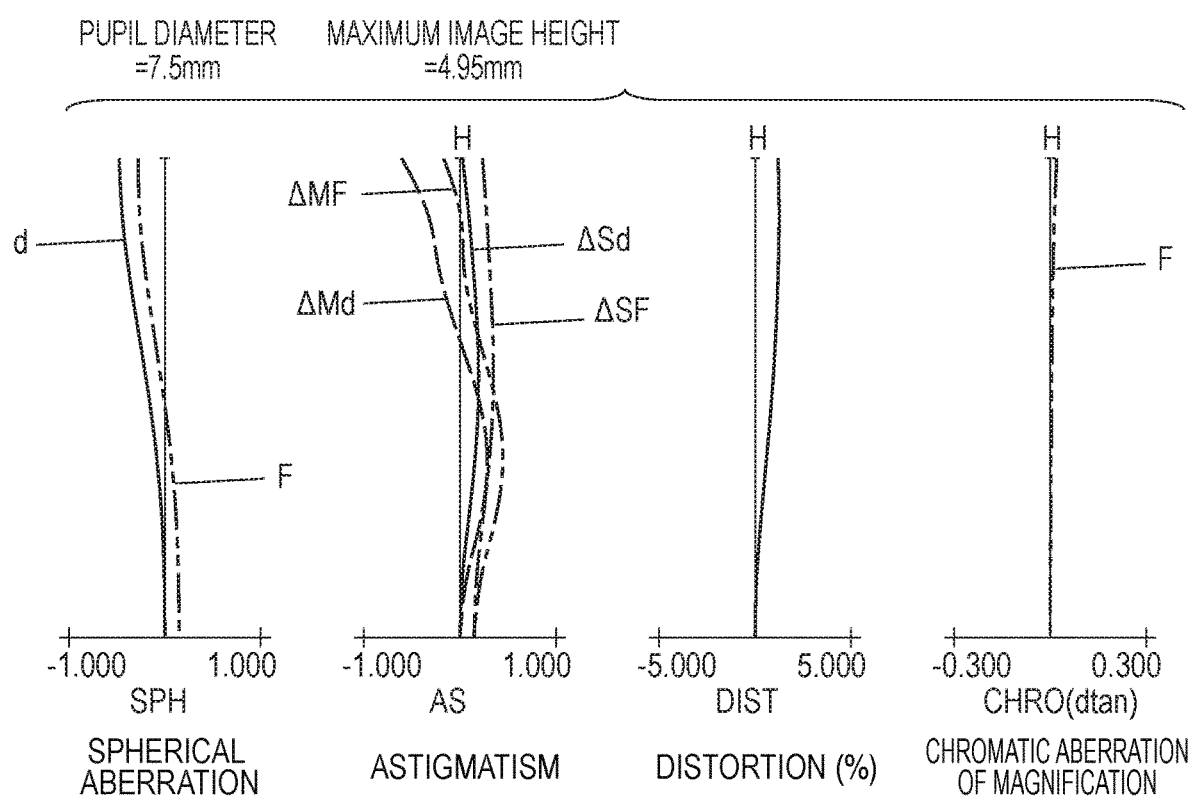
FIG. 6 is aberration diagrams of the eyepiece optical system according to Example 3.

FIG. 5 is a lens cross-sectional view of an eyepiece optical system according to Example 3 of the present invention. FIG. 6 is aberration diagrams of the eyepiece optical system according to Example 3 of the present invention at a diopter of −1.0.

Figure 7:
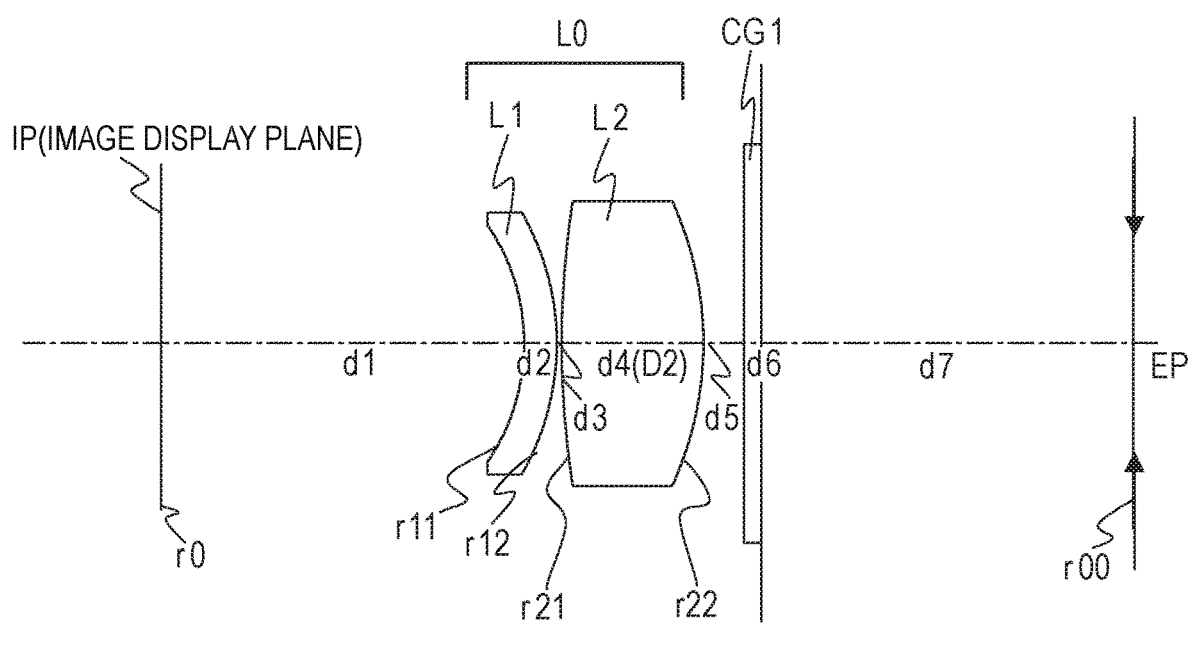
FIG. 7 is a cross-sectional view for illustrating a lens configuration of an eyepiece optical system according to Example 4 of the present invention.

FIG. 7 is a lens cross-sectional view of an eyepiece optical system according to Example 4 of the present invention.

Figure 8:
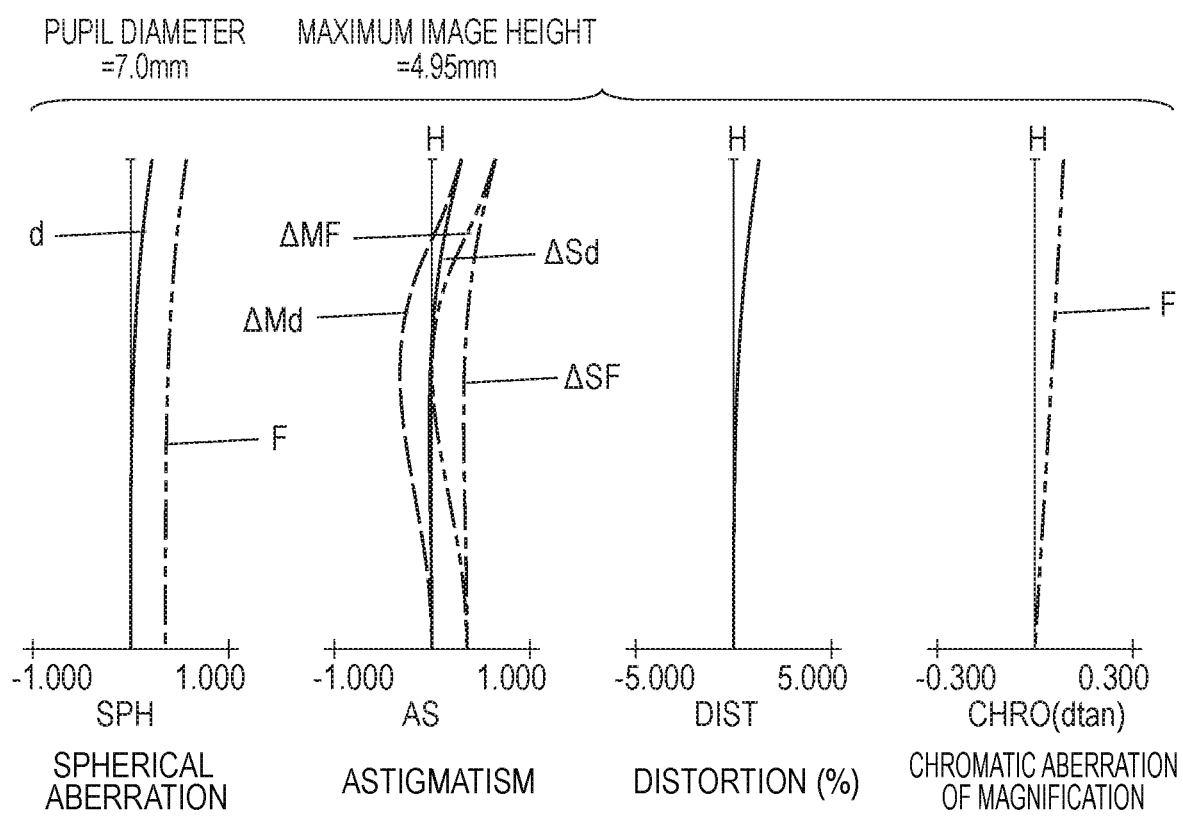
FIG. 8 is aberration diagrams of the eyepiece optical system according to Example 4.

FIG. 8 is aberration diagrams of the eyepiece optical system according to Example 4 of the present invention at a diopter of −1.0.

Figure 9:
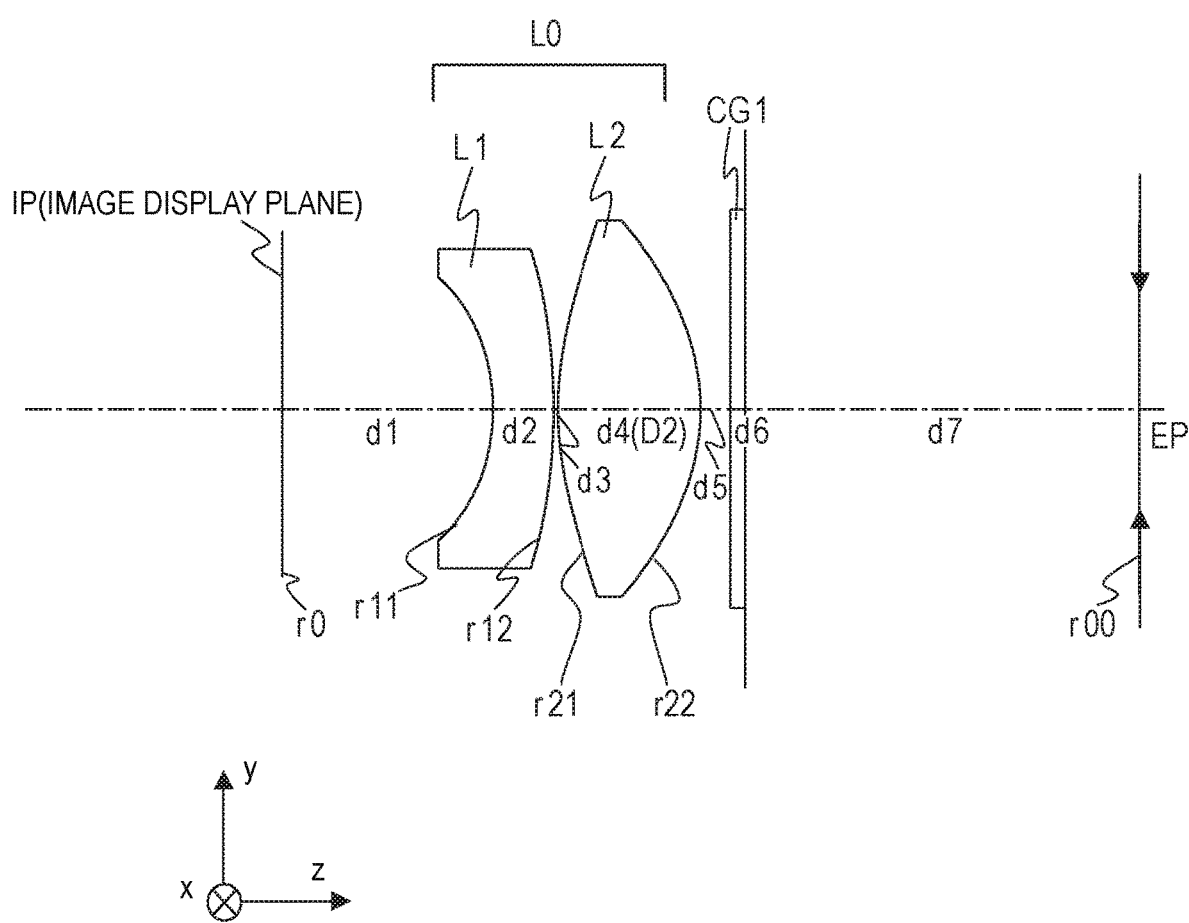
FIG. 9 is a cross-sectional view for illustrating a lens configuration of an eyepiece optical system according to Example 5 of the present invention.

FIG. 9 is a lens cross-sectional view of an eyepiece optical system according to Example 5 of the present invention.

Figure 10:
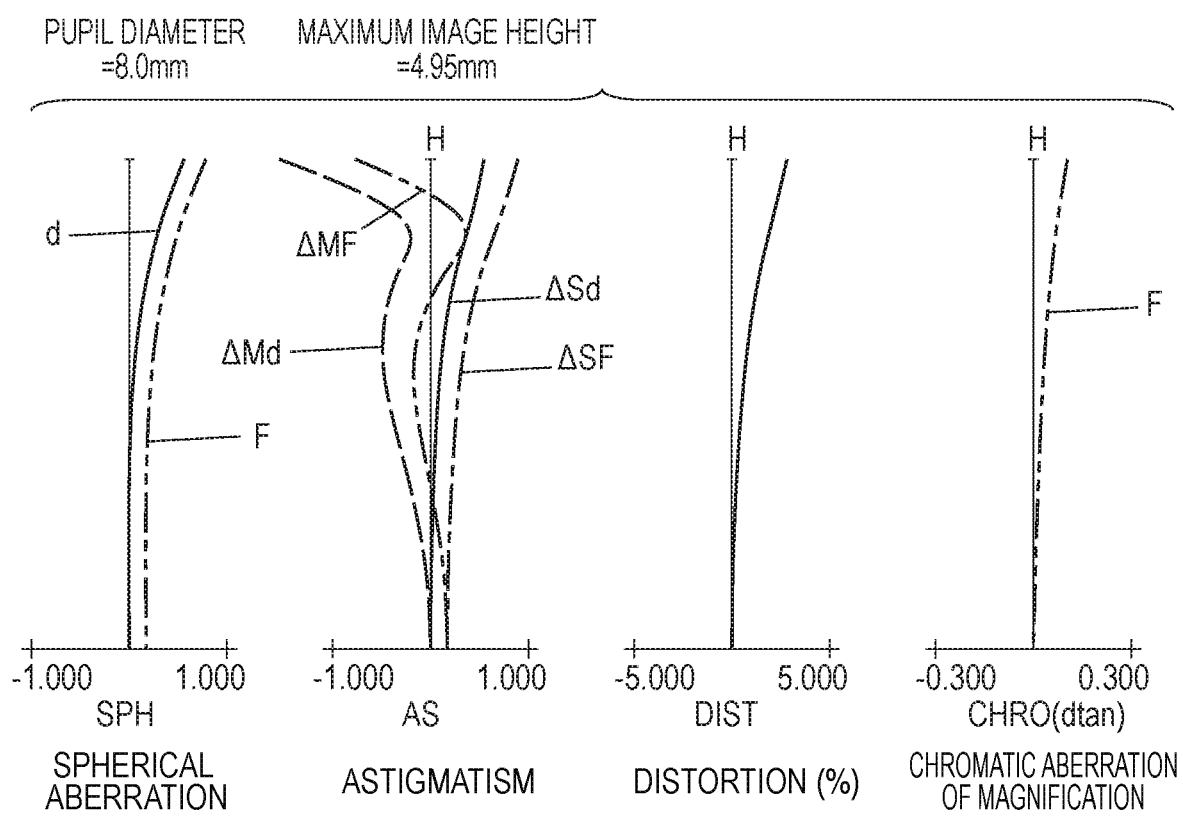
FIG. 10 is aberration diagrams of the eyepiece optical system according to Example 5.

FIG. 10 is aberration diagrams of the eyepiece optical system according to Example 5 of the present invention at a diopter of −1.0.

Figure 11:
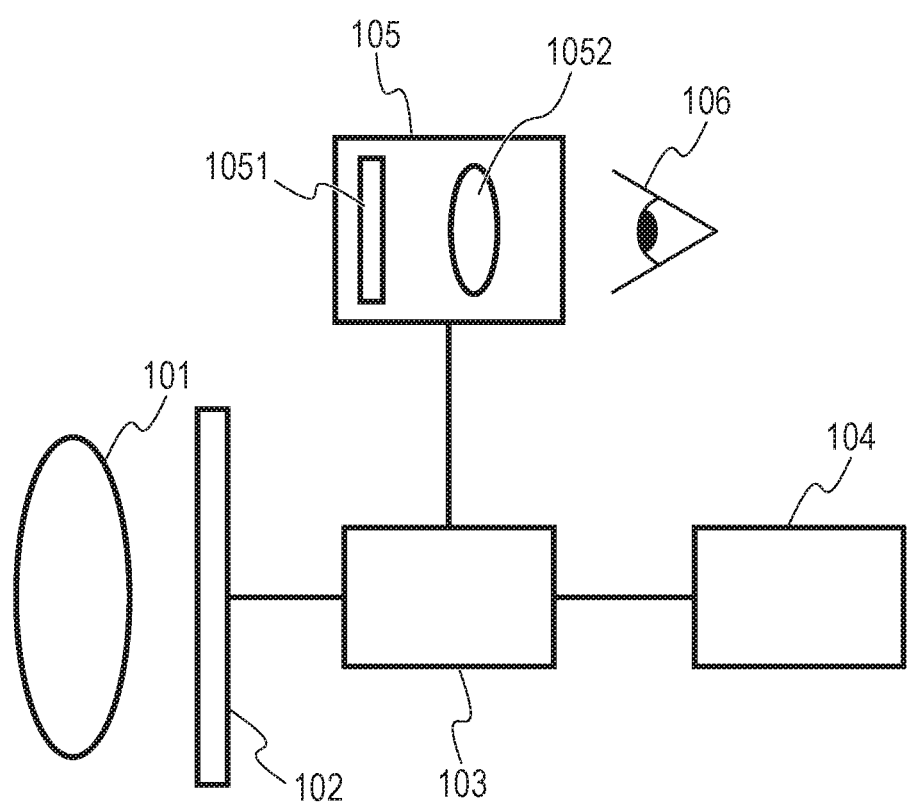
FIG. 11 is a schematic diagram of a main part of an image pickup apparatus according to one embodiment of the present invention.

FIG. 11 is a schematic diagram of a main part of an image pickup apparatus according to one embodiment of the present invention.

The eyepiece optical system according to each of Examples is used as an electronic viewfinder (observation apparatus) of a video camera, a still camera, a broadcasting camera, or other image pickup apparatus. In the lens cross-sectional views, the left side is the image display plane side, and the right side is the observation side (exit pupil side). In the lens cross-sectional views, an eyepiece optical system L0, an i-th lens Li, an image display plane IP of an image display element, which is made of liquid crystal or organic EL, for example, a design observation plane (eye point) EP for observation, and a cover glass CG1 are illustrated.

In spherical aberration diagrams of the aberration diagrams, a solid line "d" indicates a d-line (wavelength: 587.6 nm), and a dotted line F indicates an F-line (wavelength: 486.1 nm). In astigmatism diagrams, ΔSd (solid line) indicates a sagittal image plane for the d-line, and ΔMd (broken line) indicates a meridional image plane for the d-line. Similarly, ΔSF (one-dot chain line) indicates a sagittal image plane for the F-line, and ΔMF (two-dot chain line) indicates a meridional image plane for the F-line. Distortion is shown with respect to the d-line. Chromatic aberration of magnification is shown with respect to the F-line. Half a diagonal length (maximum image height) of the image display plane is represented by H. Numerical values are values obtained when numerical data to be described later is expressed in units of mm.

In the eyepiece optical system disclosed in Japanese Patent Application Laid-Open No. H08-029705 described above, lens surfaces on the image display plane side of the first lens having the negative refractive power and on the image display plane side of the second lens having the positive refractive power are formed into aspherical shapes, to thereby achieve downsizing of the entire eyepiece optical system. However, an observation magnification has not always been sufficient. In the eyepiece optical system disclosed in Japanese Patent Application Laid-Open No. H05-119274 described above, lens surfaces having aspherical shapes are used for the first lens and the second lens to achieve downsizing. However, there has been a tendency that the aspherical shapes have large aspherical amounts.

In order to observe a small image display plane (display panel) with the diagonal length of the image display plane IP of the image display element of about 20 mm or less with a large observation field (viewing angle of about 20° or more), it is required for the eyepiece optical system L0 to have a strong positive refractive power (power) as a whole. For that end, it is required for lenses forming the eyepiece optical system L0 to have a strong positive refractive power and a strong negative refractive power. Then, the number of lenses is increased in many cases. Further, the size (dimensions) of the entire eyepiece optical system L0 is often increased with an increased lens thickness, for example. Moreover, when a high magnification is to be achieved while the eyepiece optical system L0 is kept small, field curvature and chromatic aberration of magnification are increased, and it becomes difficult to correct the various aberrations.

To address this problem, as illustrated in the lens cross-sectional views, the eyepiece optical system according to each of Examples consists of two lenses in order from the image display plane IP side (object side) to the observation plane (eye point) EP side. Specifically, the eyepiece optical system consists of a first lens L1 having a negative refractive power and a second lens L2 having a positive refractive power.

In each of Examples, a position in an optical axis direction of the observation plane EP may be moved in the optical axis direction within a range in which a ray from the closest periphery of the image display plane IP passes through a pupil of an observer. Moreover, a distance from the last lens surface (in FIG. 1, FIG. 5, FIG. 7, and FIG. 9, a lens surface on the observation side of the second lens L2) to the observation plane EP is defined as "eye relief". The cover glass CG1 is a plate configured to protect the image display plane IP and the lenses, and may be disposed between the image display plane IP and a lens or between a lens and the observation plane EP, or may not necessarily be disposed.

In each of Examples, diopter adjustment is performed by moving the entire eyepiece optical system L0 (first lens and second lens).

The eyepiece optical system L0 according to each of Examples consists of, in order from the image display plane IP side to the observation side, the first lens L1 having the negative refractive power and the second lens L2 having the positive refractive power. At this time, a paraxial curvature radius of the lens surface on the image display plane IP side of the first lens L1 is represented by r11, a paraxial curvature radius of a lens surface on the observation side of the first lens L1 is represented by r12, a paraxial curvature radius of the lens surface on the image display plane IP side of the second lens L2 is represented by r21, and a paraxial curvature radius of the lens surface on the observation side of the second lens L2 is represented by r22. At this time, the following conditional expressions are satisfied:

$$-15.0 \leq (r11+r12)/(r11-12) \leq -0.2 \quad (1); \text{ and}$$

$$-0.25 \leq (r21+r22)/(r21-r22) \leq 1.5 \quad (2),$$

provided that the paraxial curvature radius is determined as a tenth of an effective ray range.

Next, an technical meanings of the above-mentioned conditional expressions are described. In the conditional expression (1), a lens shape of the first lens L1 is defined. When the ratio of the conditional expression (1) exceeds the upper limit value of the conditional expression (1), the lens surface on the image display plane IP side of the first lens becomes much milder, and it is required to set a distance between the image display plane IP and the first lens L1 large to obtain high optical performance.

Then, the entire eyepiece optical system L0 tends to be increased in size. Moreover, when the ratio of the conditional expression (1) falls below the lower limit value thereof, the negative refractive power of the first lens L1 becomes weaker (absolute value of the negative refractive power becomes smaller), and hence it becomes difficult to achieve a high observation magnification.

In the conditional expression (2), a lens shape of the second lens L2 is defined. The conditional expression (2) is intended to satisfactorily correct field curvature while maintaining the high observation magnification. When the ratio of the conditional expression (2) exceeds the upper limit value of the conditional expression (2), the high magnification is easily obtained, but the curvatures of the lens surfaces become steeper, with the result that it becomes difficult to produce the lenses. In contrast, when the ratio of the conditional expression (2) falls below the lower limit value thereof, it becomes difficult to achieve the high magnification.

It is preferred to set the numerical ranges of the conditional expressions (1) and (2) as follows.

$$-14.0 \leq (r11+r12)/(r11-12) \leq -0.5 \quad (1a)$$

$$-0.2 \leq (r21+r22)/(r21-r22) \leq 1.4 \quad (2a)$$

It is more preferred to set the numerical ranges of the conditional expressions (1a) and (2a) as follows.

$$-13.0 \leq (r11+r12)/(r11-12) \leq -0.7 \quad (1b)$$

$$-0.1 \leq (r21+r22)/(r21-r22) \leq 1.3 \quad (2b)$$

In each of Examples, it is preferred to satisfy one or more of conditional expressions provided below. A distance on an optical axis from the image display plane IP to the lens surface on the observation side of the second lens L2 at the standard diopter is represented by TTL, and a distance on the optical axis from the lens surface on the image display plane IP side of the first lens L1 to the lens surface on the observation side of the second lens L2 at the standard diopter is defined as D. An interval on the optical axis from the lens surface on the observation side of the first lens L1 to the lens surface on the image display plane IP side of the second lens L2 is represented by d3, and a thickness on the optical axis of the second lens L2 is represented by D2. A focal length of the eyepiece optical system L0 is represented by "f". A focal length of the first lens L1 is represented by L1f, and a focal length of the second lens L2 is represented by L2f.

At this time, it is preferred to satisfy one or more of the following conditional expressions.

$$0.15 \leq D/TTL \leq 0.55 \quad (3)$$

$$0.0 \leq d3/D2 \leq 0.1 \quad (4)$$

$$0.4 \leq TTL/f \leq 1.5 \quad (5)$$

$$-10 \leq L1f/L2f \leq -1 \quad (6)$$

Moreover, in each of Examples, in the observation apparatus including the image display element, on which an image is displayed, and the eyepiece optical system, which is used to observe the image displayed on the image display plane of the image display element, half the diagonal length of the image display plane of the image display element is represented by PN. Then, it is preferred to satisfy the following conditional expression:

$$0.19 < PN/f < 0.50 \quad (7).$$

Next, technical meanings of the above-mentioned conditional expressions are described. In the conditional expression (3), there is defined a ratio between the distance on the optical axis from the image display plane IP to the lens surface on the observation side of the second lens L2 at the standard diopter (diopter of −1.0) and the distance on the optical axis from the lens surface on the image display plane IP side of the first lens L1 to the lens surface on the observation side of the second lens L2 at the standard diopter. The conditional expression (3) is intended to downsize the entire system.

When the ratio of the conditional expression (3) exceeds the upper limit value of the conditional expression (3), that is, when the eyepiece optical system L0 consisting of the first lens L1 and the second lens L2 is increased in size, the high magnification is easily achieved, but the distance between the image display plane IP and the first lens L1 becomes much closer, with the result that it becomes difficult to correct the various aberrations, such as field curvature and comatic aberration. In contrast, when the ratio of the conditional expression (3) falls below the lower limit value thereof, the entire eyepiece optical system is disadvantageously increased in size.

In the conditional expression (4), there is defined a ratio between the interval d3 on the optical axis from the lens surface on the observation side of the first lens L1 to the lens surface on the image display plane IP side of the second lens L2 and the thickness (lens unit thickness) D2 on the optical axis of the second lens L2. The conditional expression ($_4$) is intended to satisfactorily correct chromatic aberration of magnification while downsizing is achieved. When the ratio of the conditional expression (4) exceeds the upper limit value of the conditional expression (4), that is, when the interval d3 becomes larger, the interval between the first lens L1 and the second lens L2 becomes much larger, and the lens system is disadvantageously increased in size. Moreover, it becomes difficult to correct chromatic aberration of magnification. The ratio of the conditional expression (4) does not fall below the lower limit value of the conditional expression (4) because of the configuration.

In the conditional expression (5), there is defined a ratio between the distance on the optical axis from the image display plane IP to the lens surface on the observation side of the second lens L2 at the standard diopter and the focal length of the entire system. The conditional expression (5) is intended to downsize the entire system. When the ratio of the conditional expression (5) exceeds the upper limit value of the conditional expression (5), that is, when the distance from the image display plane IP to the lens surface on the observation side of the second lens L2 becomes longer, the entire system is increased in size. In another case, the focal length of the entire system becomes longer, and it becomes difficult to achieve the high magnification. In contrast, when the ratio of the conditional expression (5) falls below the lower limit value thereof, the eyepiece optical system L0 is reduced in size. As a result, it becomes easy to achieve the high magnification, but it becomes difficult to satisfactorily correct the various aberrations.

In the conditional expression (6), there is defined a ratio between the focal length of the first lens L1 and the focal length of the second lens L2. The conditional expression (6) is a condition for achieving the high magnification and satisfactorily correcting the various aberrations. When the ratio of the conditional expression (6) exceeds the upper limit value of the conditional expression (6), that is, when the negative focal length of the first lens L1 becomes shorter (absolute value of the negative focal length becomes smaller), it becomes difficult to correct chromatic aberration of magnification. In contrast, when the ratio of the conditional expression (6) falls below the lower limit value thereof, the negative refractive power of the first lens L1 becomes weaker, and hence it becomes difficult to achieve the high magnification.

According to Examples, through satisfaction of the various conditions described above, it is easy to obtain the small eyepiece optical system having a wide viewing angle and high optical performance with field curvature, chromatic aberration of magnification, and other various aberrations being satisfactorily corrected.

In the conditional expression (7), there is defined a ratio between half the diagonal length of the effective area of the image display plane IP of the image display element and the focal length of the entire system. The conditional expression (7) is intended to achieve the high magnification while securing a predetermined length of the eye relief. When the ratio of the conditional expression (7) exceeds the upper limit of the conditional expression (7), the focal length of the entire system becomes shorter and is thus advantageous for achieving the high magnification, but it becomes difficult to obtain high optical performance. When the ratio of the conditional expression (7) falls below the lower limit value thereof, the refractive power (power) of the entire system becomes weaker, and it becomes difficult to achieve the high magnification.

It is preferred to set the numerical ranges of the conditional expressions (3) to (7) as follows.

$$0.16 \leq D/TTL \leq 0.50 \quad (3a)$$

$$0.01 \leq d3/D2 \leq 0.08 \quad (4a)$$

$$0.5 \leq TTL/f \leq 1.3 \quad (5a)$$

$$-8.0 \leq L1f/L2f \leq -1.2 \quad (6a)$$

$$0.19 < PN/f < 0.40 \quad (7a)$$

It is more preferred to set the numerical ranges of the conditional expressions (3a) to (7a) as follows.

$$0.17 \leq D/TTL \leq 0.49 \quad (3b)$$

$$0.02 \leq d3/D2 \leq 0.07 \quad (4b)$$

$$0.6 \leq TTL/f \leq 1.2 \quad (5b)$$

$$-7.0 \leq L1f/L2f \leq -1.4 \quad (6b)$$

$$0.19 < PN/f < 0.35 \quad (7b)$$

Numerical data corresponding to each of Examples of the present invention is provided below. In numerical data, an apparent field of view (half angle of field) at a diopter of −1 (standard diopter) is represented by "ω". A paraxial curvature radius of a j-th surface of the i-th lens in order from the image display plane IP to the observation plane EP side is represented by "rij", and r0 indicates the display panel (image display plane). In Numerical Data 1 to Numerical Data 5, r31 and r32 indicate the cover glass.

An axial surface interval between the i-th surface and an (i+1)-th surface in order from the image display plane IP is represented by "di". Further, a refractive index of a material between the i-th surface and the (i+1)-th surface with respect to the d-line (wavelength=578.6 nm) is represented by Ndi, and an Abbe number of the material between the i-th surface and the (i+1)-th surface with respect to the d-line is represented by "vdi".

In the numerical data, the unit of the length provided is millimeters unless otherwise specified. However, the same optical performance of the eyepiece optical system L0 can be obtained even when the values are proportionally enlarged or proportionally reduced, and hence the unit is not limited to millimeters and may be another appropriate unit. A surface having a surface number suffixed by the asterisk "*" in the numerical data has an aspherical shape defined by the following expression (8).

$$x = \frac{h^2/R}{1+\sqrt{1-(1+k)(h/R)^2}} + c2h^2 + c4h^4 + c6h^6 + c8h^8 + c10h^{10} \quad (8)$$

In the expression (8), "x" represents a distance from the apex of the lens surface in the optical axis direction, "h" represents a height in the direction perpendicular to the optical axis, R represents a paraxial curvature radius at the apex of the lens surface, "k" represents a conic constant, and c2, c4, c6, and c8 represent polynomial coefficients. In the aspherical coefficients, "E−i" represents an exponential notation using 10 as its base, that is, "×10−i". Calculation results of the above-mentioned conditional expressions in each set of the numerical data are shown in Table 1. The exemplary embodiments of the present invention are described above, but the present invention is not limited to those embodiments and can be modified and changed variously within the scope of the gist thereof.

| [Numerical Data 1] | | |
|---|---|---|
| Focal length | Diagonal length of image display plane IP | 2ω [°] |
| 21.67 | 9.9 | 25.9 |

| Lens data | | | | |
|---|---|---|---|---|
| Surface | Paraxial curvature radius | Interval on optical axis | Refractive index (Nd) | Abbe number (vd) |
| r0 | Display panel | d1 | Variable | |
| r11* | −9.19 | d2 | 1.70 | 1.636 | 23.9 |
| r12 | −23.73 | d3 | 0.17 | | |
| r21 | 18.23 | d4 | 5.45 | 1.532 | 55.8 |
| r22* | −10.71 | d5 | Variable | | |
| r31 | 0.00 | d6 | 0.80 | 1.492 | 57.4 |
| r32 | 0.00 | d7 | 16.00 | | |
| EP | | | | |

| Aspherical coefficient | | | | |
|---|---|---|---|---|
| | k | C2 | C4 | C6 | C8 |
| r11* | 0.00E+00 | 0.00E+00 | −1.45E−04 | 0.00E+00 | 0.00E+00 |
| r22* | 0.00E+00 | 0.00E+00 | 1.32E−04 | 1.34E−06 | 0.00E+00 |

| Variable interval | | | | |
|---|---|---|---|---|
| Diopter [dpt] | 0 | −3 | +1 | −1 |
| d1 | 15.41 | 14.04 | 15.88 | 14.87 |
| d5 | 1.77 | 3.14 | 1.30 | 2.31 |

| [Numerical Data 2] | | |
|---|---|---|
| Focal length | Diagonal length of image display plane IP | 2ω [°] |
| 21.9 | 9.9 | 25.7 |

| Lens data | | | | |
|---|---|---|---|---|
| Surface | Paraxial curvature radius | Interval on optical axis | Refractive index (Nd) | Abbe number (vd) |
| r0 | Display panel | d1 | Variable | |
| r11* | −10.02 | d2 | 1.60 | 1.583 | 30.2 |
| r12 | 413.74 | d3 | 0.17 | | |
| r21* | 10.69 | d4 | 5.30 | 1.492 | 57.4 |
| r22* | −9.67 | d5 | Variable | | |
| r31 | 0.00 | d6 | 0.65 | 1.492 | 57.4 |
| r32 | 0.00 | d7 | 16.00 | | |
| EP | | | | |

[Numerical Data 2]

Aspherical coefficient

| | k | C2 | C4 | C6 | C8 |
|---|---|---|---|---|---|
| r11* | 1.35E+00 | 0.00E+00 | 1.46E−04 | 6.88E−06 | 0.00E+00 |
| r21* | −2.01E+00 | 0.00E+00 | −1.42E−04 | 4.00E−07 | 0.00E+00 |
| r22* | 0.00E+00 | 0.00E+00 | 1.95E−04 | 0.00E+00 | 0.00E+00 |

Variable interval

| Diopter [dpt] | 0 | −3 | +1 | −1 |
|---|---|---|---|---|
| d1 | 15.69 | 14.23 | 16.12 | 15.16 |
| d5 | 1.23 | 2.69 | 0.80 | 1.76 |

[Numerical Data 3]

| Focal length | Diagonal length of image display plane IP | 2ω [°] |
|---|---|---|
| 24.7 | 9.9 | 23.2 |

Lens data

| Surface | Paraxial curvature radius | Interval on optical axis | Refractive index (Nd) | Abbe number (vd) |
|---|---|---|---|---|
| r0 | Display panel | d1 Variable | | |
| r11* | −5.53 | d2 1.55 | 1.636 | 23.9 |
| r12 | −12.61 | d3 0.15 | | |
| r21* | −80.00 | d4 2.20 | 1.768 | 49.2 |
| r22* | −8.40 | d5 Variable | | |
| r31 | 0.00 | d6 0.70 | 1.492 | 57.4 |
| r32 | 0.00 | d7 16.00 | | |
| EP | | | | |

[Numerical Data 3]

Aspherical coefficient

| | k | C2 | C4 | C6 | C8 |
|---|---|---|---|---|---|
| r11* | −2.51E−01 | 0.00E+00 | 8.66E−06 | 0.00E+00 | 0.00E+00 |
| r21* | −9.48E+02 | 0.00E+00 | 0.00E+00 | 0.00E+00 | 0.00E+00 |
| r22* | 0.00E+00 | 0.00E+00 | 3.02E−04 | −1.67E−06 | 5.98E−08 |

Variable interval

| Diopter [dpt] | 0 | −3 | +1 | −1 |
|---|---|---|---|---|
| d1 | 18.67 | 16.84 | 19.23 | 18.00 |
| d5 | 1.36 | 3.19 | 0.80 | 2.02 |

[Numerical Data 4]

| Focal length | Diagonal length of image display plane IP | 2ω [°] |
|---|---|---|
| 22.7 | 9.9 | 25.0 |

Lens data

| Surface | Paraxial curvature radius | Interval on optical axis | Refractive index (Nd) | Abbe number (vd) |
|---|---|---|---|---|
| r0 | Display panel | d1 Variable | | |
| r11* | −10.10 | d2 1.50 | 1.651 | 21.5 |
| r12 | −12.00 | d3 0.22 | | |
| r21 | 41.52 | d4 6.50 | 1.553 | 71.7 |
| r22* | −15.42 | d5 Variable | | |
| r31 | 0.00 | d6 0.80 | 1.492 | 57.4 |
| r32 | 0.00 | d7 17.00 | | |
| EP | | | | |

Aspherical coefficient

| | k | C2 | C4 | C6 | C8 |
|---|---|---|---|---|---|
| r11* | 2.98E−01 | 0.00E+00 | −5.47E−05 | 0.00E+00 | 0.00E+00 |
| r22* | 0.00E+00 | 0.00E+00 | 9.12E−06 | −3.41E−07 | 8.87E−09 |

Variable interval

| Diopter [dpt] | 0 | −3 | +1 | −1 |
|---|---|---|---|---|
| d1 | 17.18 | 15.59 | 17.64 | 16.61 |
| d5 | 1.26 | 2.85 | 0.80 | 1.83 |

[Numerical Data 5]

| Focal length | Diagonal length of image display plane IP | 2ω [°] |
|---|---|---|
| 16.9 | 9.9 | 33.5 |

Lens data

| Surface | Paraxial curvature radius | Interval on optical axis | Refractive index (Nd) | Abbe number (vd) |
|---|---|---|---|---|
| r0 | Display panel | d1 Variable | | |
| r11* | −9.37 | d2 2.76 | 1.636 | 23.9 |
| r12* | −28.67 | d3 0.19 | | |
| r21* | 14.94 | d4 6.54 | 1.553 | 71.7 |
| r22* | −10.25 | d5 Variable | | |

-continued

[Numerical Data 5]

| | | | | | |
|---|---|---|---|---|---|
| r31 | 0.00 | d6 | 0.65 | 1.492 | 57.4 |
| r32 | 0.00 | d7 | 18.00 | | |
| EP | | | | | |

Aspherical coefficient

| | k | C2 | C4 | C6 | C8 | C10 |
|---|---|---|---|---|---|---|
| r11* | 7.00E−01 | 0.00E+00 | 0.00E+00 | 0.00E+00 | 0.00E+00 | 0.00E+00 |
| r12* | 0.00E+00 | 0.00E+00 | −3.81E−05 | 0.00E+00 | 0.00E+00 | 0.00E+00 |
| r21* | 0.00E+00 | 0.00E+00 | −1.90E−04 | 3.50E−07 | 0.00E+00 | 0.00E+00 |
| r22* | 0.00E+00 | 0.00E+00 | 1.48E−04 | −3.63E−08 | 2.50E−09 | 8.93E−11 |

Variable interval

| Diopter [dpt] | 0 | −3 | +1 | −1 |
|---|---|---|---|---|
| d1 | 9.96 | 9.08 | 10.21 | 9.65 |
| d5 | 1.05 | 1.94 | 0.80 | 1.36 |

TABLE 1

| Conditional Expression | Numerical Data | | | | |
|---|---|---|---|---|---|
| | 1 | 2 | 3 | 4 | 5 |
| (1) | −2.264 | −0.953 | −2.565 | −11.632 | −1.971 |
| (2) | 0.260 | 0.050 | 1.235 | 0.459 | 0.186 |
| (3) | 0.330 | 0.318 | 0.178 | 0.331 | 0.496 |
| (4) | 0.0312 | 0.0311 | 0.0682 | 0.0331 | 0.0284 |
| (5) | 1.02 | 1.02 | 0.89 | 1.09 | 1.14 |
| (6) | −1.82 | −1.48 | −1.41 | −6.72 | −1.91 |
| (7) | 0.228 | 0.227 | 0.200 | 0.218 | 0.294 |

Next, the image pickup apparatus according to an embodiment of the present invention, which uses the eyepiece optical system described in each of Examples, is described with reference to FIG. 11. An object image formed by an image pickup optical system 101 is converted into an electric signal by an image pickup element (light receiving element) 102, which is a photoelectric conversion element. As the image pickup element 102, a CCD sensor or a CMOS sensor is used, for example.

An output signal from the image pickup element 102 is processed in an image processing circuit 103 to form an image. The formed image is recorded in a recording medium 104 such as a semiconductor memory, a magnetic tape, or an optical disc. The image formed in the image processing circuit 103 is also displayed on an observation apparatus 105. The observation apparatus 105 includes an image display element 1051 and an eyepiece optical system 1052 according to each of Examples. The image display element 1051 is formed of a liquid crystal display device (LCD) or a CRT, for example. Image information displayed on the image display element 1051 is observed at an eye point 106 through the eyepiece optical system 1052.

Through application of the eyepiece optical system 1052 according to each of Examples of the present invention to a digital camera, a video camera, or other image pickup apparatus as described above, there can be obtained an image pickup apparatus having a wide viewing angle, a small size, and high optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-037250, filed Mar. 2, 2018, which is hereby incorporated by reference herein in its entirety.

What is claimed is:

1. An observation apparatus comprising:
    an image display element configured to display an image on an image display plane; and
    an eyepiece optical system to be used to observe the image displayed on the image display plane,
    wherein the observation apparatus has no lenses other than the eyepiece optical system on observation side of the image display element,
    wherein the eyepiece optical system consists of:
        a first lens having a negative refractive power, and
        a second lens disposed on an observation side of the first lens and having a positive refractive power, and
    wherein the following conditional expressions:

$-15.0 \leq (r11+r12)/(r11-r12) \leq -0.2;$ $-0.25 \leq (r21+r22)/(r21-r22) \leq 1.50;$ and $0.19 < PN/f < 0.40,$ are satisfied where r11 represents a paraxial curvature radius of a lens surface on an image display plane side of the first lens, r12 represents a paraxial curvature radius of a lens surface on the observation side of the first lens, r21 represents a paraxial curvature radius of a lens surface on the image display plane side of the second lens, r22 represents a paraxial curvature radius of a lens surface on the observation side of the second lens, f represents a focal length of the eyepiece optical system which is a composite focal length of the first lens and the second lens, and PN represents half a diagonal length of the image display plane of the image display element.

2. The observation apparatus according to claim 1, wherein the following conditional expression:

$0.15 \leq D/TTL \leq 0.55,$ is satisfied where TTL represents a distance on an optical axis from the image display plane to the lens surface on the observation side of the second lens at −1.0 diopter, and D represents a distance on the optical axis from the lens surface on the image display plane side of the first lens to the lens surface on the observation side of the second lens at −1.0 diopter.

3. The observation apparatus according to claim 1, wherein the following conditional expression:

$$0.0 \leq d3/D2 \leq 0.1,$$

is satisfied where d3 represents an interval on an optical axis from the lens surface on the observation side of the first lens to the lens surface on the image display plane side of the second lens, and D2 represents a thickness on the optical axis of the second lens.

4. The observation apparatus according to claim 1, wherein the following conditional expression:

$$0.4 \leq TTL/f \leq 1.5,$$

is satisfied where TTL represents a distance on an optical axis from the image display plane to the lens surface on the observation side of the second lens at −1.0 diopter, and f represents the focal length of the eyepiece optical system.

5. The observation apparatus according to claim 1, wherein the following conditional expression:

$$-10 \leq L1f/L2f \leq -1,$$

is satisfied where L1f represents a focal length of the first lens, and L2f represents a focal length of the second lens.

6. The observation apparatus according to claim 1, wherein the first lens and the second lens are configured to move along an optical axis during diopter adjustment.

7. An image pickup apparatus comprising:
an image pickup optical system configured to take an object image;
a light receiving element configured to receive the object image formed by the image pickup optical system; and
an observation apparatus to be used to observe the object image received by the light receiving element,
wherein the observation apparatus includes an image display element configured to display an image on an image display plane, and an eyepiece optical system to be used to observe the image displayed on the image display plane, wherein the observation apparatus has no lenses other than the eyepiece optical system on observation side of the image display element,
wherein the eyepiece optical system consists of a first lens having a negative refractive power and a second lens disposed on an observation side of the first lens and having a positive refractive power, and
wherein the following conditional expressions:

$$-15.0 \leq (r11+r12)/(r11-r12) \leq -0.2;$$

$$-0.25 \leq (r21+r22)/(r21-r22) \leq 1.50; \text{ and}$$

$$0.19 < PN/f < 0.40,$$

are satisfied where r11 represents a paraxial curvature radius of a lens surface on an image display plane side of the first lens, r12 represents a paraxial curvature radius of a lens surface on the observation side of the first lens, r21 represents a paraxial curvature radius of a lens surface on the image display plane side of the second lens, r22 represents a paraxial curvature radius of a lens surface on the observation side of the second lens, f represents a focal length of the eyepiece optical system which is a composite focal length of the first lens and the second lens, and PN represents half a diagonal length of the image display plane of the image display element.

8. The observation apparatus according to claim 1, wherein the following conditional expression:

$$-1.91 \leq L1f/L2f \leq -1,$$

is satisfied where L1f represents a focal length of the first lens, and L2f represents a focal length of the second lens.

* * * * *